(12) United States Patent
Derbeko et al.

(10) Patent No.: US 9,116,811 B1
(45) Date of Patent: Aug. 25, 2015

(54) SYSTEM AND METHOD FOR CACHE MANAGEMENT

(75) Inventors: Philip Derbeko, Modiin (IL); Assaf Natanzon, Tel Aviv (IL); Anat Eyal, Tel Aviv (IL); Constantine Antonovich, Raman Gan (IL)

(73) Assignee: EMC Corporation, Hopkinton, MA (US)

( * ) Notice: Subject to any disclaimer, the term of this patent is extended or adjusted under 35 U.S.C. 154(b) by 220 days.

(21) Appl. No.: 13/539,396

(22) Filed: Jun. 30, 2012

(51) Int. Cl.
*G06F 12/10* (2006.01)
*G06F 12/08* (2006.01)
*G06F 11/20* (2006.01)
*G06F 11/14* (2006.01)

(52) U.S. Cl.
CPC ........ *G06F 12/0802* (2013.01); *G06F 11/1456* (2013.01); *G06F 11/2056* (2013.01); *G06F 11/2074* (2013.01)

(58) Field of Classification Search
CPC ............ G06F 12/0802; G06F 11/2056; G06F 11/1456; G06F 11/2074
USPC ........................................................ 711/118
See application file for complete search history.

(56) References Cited

U.S. PATENT DOCUMENTS 8,171,246 B2 * 5/2012 Balasubramanian ......... 711/162
2003/0191916 A1 * 10/2003 McBrearty et al. ........... 711/162

* cited by examiner

*Primary Examiner* — Jae Yu
(74) *Attorney, Agent, or Firm* — Brian J. Colandreo; Mark H. Whittenberger; Holland & Knight LLP

(57) ABSTRACT

A method, computer program product, and computing system for providing an option to a user of a cache system to have a copy of at least one IO operation directed toward the cache system redundantly provided to a remote device. If the user selects to have the copy of at least one IO operation redundantly provided, the copy of the at least one IO operation directed toward the cache system is provided to the remote device.

18 Claims, 3 Drawing Sheets

SYSTEM AND METHOD FOR CACHE MANAGEMENT

TECHNICAL FIELD

This disclosure relates to cache memory systems and, more particularly, to the preservation of data within cache memory systems.

BACKGROUND

Storing and safeguarding of electronic content is of paramount importance in modern business. Accordingly, various systems may be employed to protect such electronic content. In order to maintain such electronic content, systems and methods must be employed to ensure the integrity of such electronic content. Specifically, in the event of the failure of a cache memory system, performance may be greatly reduced. Further, data may be permanently lost depending on the manner in which the cache system is configured (e.g., when configured as a write-back cache).

SUMMARY OF DISCLOSURE

In a first implementation, a computer-implemented method includes providing an option to a user of a cache system to have a copy of at least one IO operation directed toward the cache system redundantly provided a remote device. If the user selects to have the copy of at least one IO operation redundantly provided, the copy of the at least one IO operation directed toward the cache system is provided to the remote device.

One or more of the following features may be included. The remote device may be a remote mirroring device. The remote mirroring device may be configured to maintain a single current copy of the data stored within the cache system. The remote device may be a remote replication appliance. The remote replication appliance may be configured to maintain a single current copy of the data stored within the cache system and at least one historical copy of the data stored within the cache system. The at least one IO operation may include at least one write operation. The cache system may be a write-back cache system.

In another implementation, a computer program product resides on a computer readable medium that has a plurality of instructions stored on it. When executed by a processor, the instructions cause the processor to perform operations including providing an option to a user of a cache system to have a copy of at least one IO operation directed toward the cache system redundantly provided a remote device. If the user selects to have the copy of at least one IO operation redundantly provided, the copy of the at least one IO operation directed toward the cache system is provided to the remote device.

One or more of the following features may be included. The remote device may be a remote mirroring device. The remote mirroring device may be configured to maintain a single current copy of the data stored within the cache system. The remote device may be a remote replication appliance. The remote replication appliance may be configured to maintain a single current copy of the data stored within the cache system and at least one historical copy of the data stored within the cache system. The at least one IO operation may include at least one write operation. The cache system may be a write-back cache system.

In another implementation, a computing system includes at least one processor and at least one memory architecture coupled with the at least one processor, wherein the computing system is configured to perform operations including providing an option to a user of a cache system to have a copy of at least one IO operation directed toward the cache system redundantly provided a remote device. If the user selects to have the copy of at least one IO operation redundantly provided, the copy of the at least one IO operation directed toward the cache system is provided to the remote device.

One or more of the following features may be included. The remote device may be a remote mirroring device. The remote mirroring device may be configured to maintain a single current copy of the data stored within the cache system. The remote device may be a remote replication appliance. The remote replication appliance may be configured to maintain a single current copy of the data stored within the cache system and at least one historical copy of the data stored within the cache system. The at least one IO operation may include at least one write operation. The cache system may be a write-back cache system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview

Figure 1:
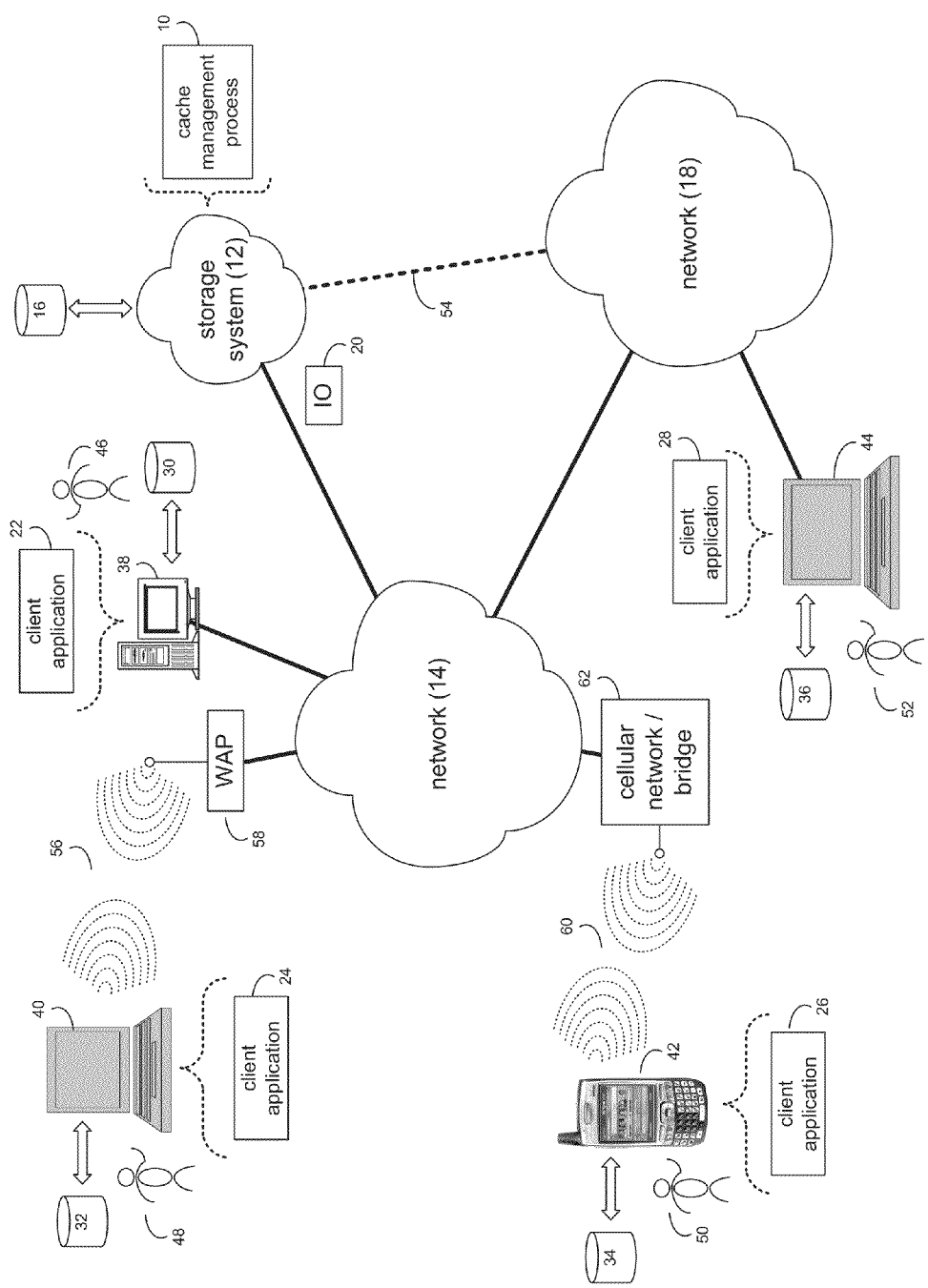
FIG. 1 is a diagrammatic view of a storage system and a cache management process coupled to a distributed computing network.

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to IO write requests (i.e. a request that content be written to storage system 12) and IO read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of rotating, electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
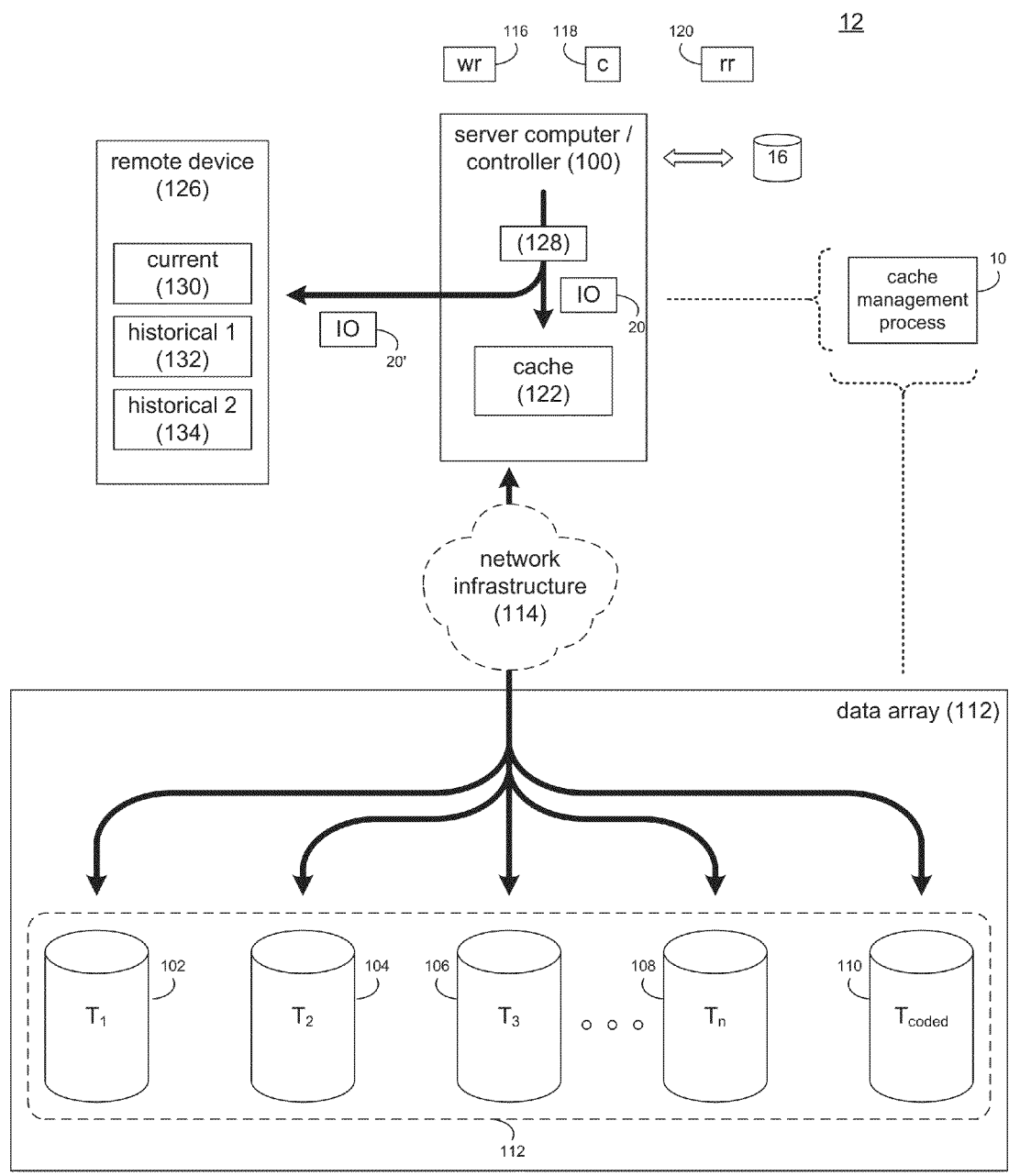
FIG. 2 is a diagrammatic view of the storage system of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured in a non-RAID fashion or as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more rotational, electro-mechanical hard disk drives, wherein a combination of storage targets 102, 104, 106, 108 and coded target 110 may form data array 112. Examples of the rotational, electro-mechanical hard disk drives may include but are not limited to SATA drives, SCSI drives, SAS drives, IDE drives, and EIDE drives.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to IO write request 116 (i.e. a request that content 118 be written to storage system 12) and IO read request 120 (i.e. a request that content 118 be read from storage system 12).

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 112.

The Cache Management Process:

As discussed above, various IO requests (e.g. IO request 20) may be sent from client applications 22, 24, 26, 28 to storage system 12 and/or (when server computer/controller 100 is configured as an application server) internally generated within server computer/controller 100. IO request 20 may include but are not limited to IO write request 116 and IO read request 120.

Storage system 12 may include cache system 122, which may temporarily store a portion of the data included within data array 112. Cache system 122 may be configured as e.g., a write through cache system or a write back cache system. As is known in the art, a write through cache system is a cache system in which data to be written to data array 112 (e.g., as defined within IO write request 116) is written to cache system 122 and immediately written to data array 112. Conversely, a write back cache system is a cache system in which data to be written to data array 112 (e.g., as defined within IO write request 116) is written to cache system 122 and then subsequently destaged to data array 112. Accordingly, in the event that cache system 122 is configured as a write back cache and cache system 122 fails prior to the data included within cache system 122 being destaged to data array 112, data will be lost. Accordingly, it may be desireable to maintain a realtime (or quasi-realtime) backup copy of the data included within cache system 122 so that data will not be lost in the event of a failure of cache system 122. Assume for the following discussion that cache system 122 is configured as a write-back cache system.

Figure 4:
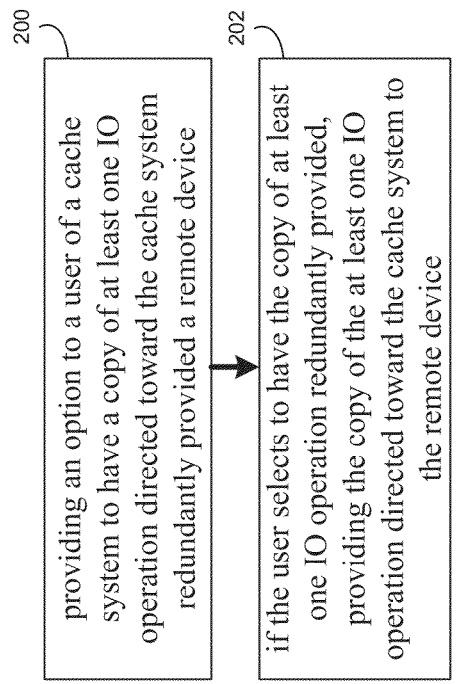
FIG. 4 is a diagrammatic view of a user interface rendered by the cache management process of FIG. 1.
Figure 3:
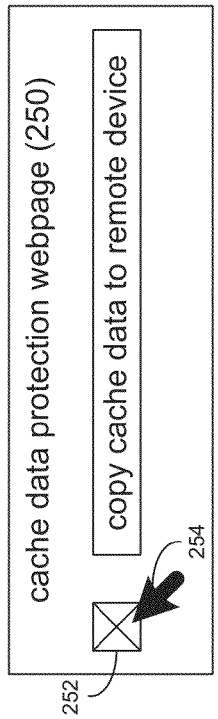
FIG. 3 is a flow chart of the cache management process of FIG. 1.

Assume for illustrative purposes that user 46 is an administrator of storage system 12. Accordingly and referring also to FIG. 3, when configuring storage system 12, cache management process 10 may provide 200 an option to user 46 of cache system 122 to have a copy of at least one IO operation directed toward cache system 122 redundantly provided to a remote device (e.g., remote device 124). The manner in which user 46 is provided with this option may vary depending upon the manner in which cache system 122 and storage system 12 (in which cache system 122 is included) are configured. For example, if storage system 12 (and cache system 122 within storage system 12) are configurable via a user interface (e.g., user interface 250, FIG. 4) rendered by cache management process 10, when providing 200 user 46 with the option of having IO operations redundantly provided to a remote device (e.g., remote device 126), cache management process 10 may provide a checkbox (e.g., checkbox 252, FIG. 4) that may be selectable via onscreen pointer (e.g., onscreen pointer 254, FIG. 4) by user 46. Alternatively, cache management process 10 may provide 200 user 46 with the option of having IO operations redundantly provided to a remote device (e.g., remote device 124) by allowing user 46 to code (via one or more programming/configuration languages) instructions to have IO operations redundantly provided to a remote device (e.g., remote device 124).

If user 46 selects to have a copy of at least one IO operation redundantly provided to remote device 124, cache management process 10 may configure a driver (e.g., driver 128) that captures IO requests (e.g., IO request 20) that, as discussed above, may include IO write request 116 (i.e. a request that content 118 be written to storage system 12) and IO read request 120 (i.e. a request that content 118 be read from storage system 12).

As is known in the art, IO read requests (e.g., IO read request 120) that result in a cache hit do not impact the data stored within cache system 122, as the data requested via IO read request 120 is present in the cache and a copy of that data within cache system 122 is simply provided to the host (e.g., server computer/controller 100) requesting the data.

However, IO read requests (e.g., IO read request 120) that result in a cache miss do impact the data stored within cache system 122, as the data requested via IO read request 120 is not present in the cache and must be obtained from data array 112. Once obtained from data array 112, a copy of the obtained data is typically placed into cache system 122 and a copy of the obtained data is provided to the host (e.g., server computer/controller 100) requesting the data.

Further, IO write requests (e.g., IO write request 116) typically always results in data being written to cache system 122.

Accordingly, if user 46 selects to have a copy of at least one IO operation redundantly provided to remote device 126, driver 128 (e.g., a splitter) may monitor the IO requests provided to cache system 122 and provide 202 a copy of the at least one IO operation (e.g., IO request 20') initially directed toward cache system 122 to remote device 124. As discussed above, copied IO operations that are provided 202 to remote device 124 are typically IO write requests (e.g., IO write request 116) and IO read requests (e.g., IO read request 120) that resulted in a cache miss (as data obtained from data array 112 will be copied to cache system 122).

As will be discussed below, remote device 126 may be a remote mirroring device or a remote replication appliance.

If remote device 126 is configured as a remote mirroring device, remote device 124 may be configured to maintain a single current copy (e.g., current copy 130) of the data stored within cache system 122. Accordingly and when configured in this fashion, remote device 126 may only maintain a single current copy of the data stored within cache system 122. Therefore, historical copies will not be maintained by remote device 126 when configured in this fashion. Accordingly and in this particular implementation, remote device 126 is configured to provide a restoration copy of the data included within cache system 122 in the event of a failure of cache system 122. However, in the event that user 46 wishes to restore an earlier version of the data included within cache system 122, remote device 126 will not be able to provide the required data, as remote device 126 does not maintain a historical copies of the data included within cache system 122.

If remote device 126 is configured as a remote replication appliance, remote device 124 may be configured to maintain a single current copy (e.g., current copy 130) of the data stored within cache system 122 and at least one historical copy (e.g., historical copies 132, 134) of the data stored within cache system 122. Accordingly and in this particular embodiment, remote device 126 is configured to provide a restoration copy of the data included within the cache system 122 in the event of a failure of cache system 122. Further, in the event that user 46 wishes to restore an earlier version of the data included within cache system 122, remote device 124 may be able to provide the required data, as remote device 126 does maintain historical copies (e.g., historical copies 132, 134) of the data included within cache system 122.

While in this particular example, two historical copies (e.g., historical copies 132, 134) are shown to be maintained by remote device 126, this is for illustrative purposes only and is not intended to be a limitation disclosure, as other configurations are possible. For example, the quantity of historical copies maintained may be increased or decreased depending upon e.g. system requirements and available storage capacity.

Accordingly, through the use of remote device 126 (whether configured as a remote mirroring device or a remote replication appliance), a current copy (e.g., current copy 130) may be maintained on remote device 126. Therefore, in the event of a failure of cache system 122, current copy 130 may be used to rebuild cache system 122 by populating cache system 122 with the data included within current copy 130. Thus, storage system 12 will not suffer from the low performance associated with a cold cache system.

Cache management process 10 may be configured to synchronize the historical copies (e.g., historical copies 132, 134) of the data included within cache system 122 with data array 112. For example, cache management process 10 and driver 128 may create 300 an historical point at the backend storage array; notify remote device 126 to create the historical point; remote device 126 may create the historical point with the current data; (and to restore) cache management process 10 may retrieve the historical point from storage; and cache management process 10 may restore the historical point in cache. Remote device 126 may be used either to recover server computer/controller 100 or to function as a replacement in the event of a server crash (without the need to warm the cache).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   providing an option to a user of a cache system to have a copy of at least one IO (input/output) operation directed toward the cache system redundantly provided to a remote device;
   if the user selects to have the copy of at least one IO operation redundantly provided, automatically providing the copy of the at least one IO operation directed toward the cache system to the remote device to maintain a realtime backup copy and at least one historical copy of data from the cache system within the remote device; and
   if the user selects to restore an earlier version of the data included within the cache system, providing the earlier version of the data from the at least one historical copy;
   wherein the remote device functions as a replacement for the cache system during a server crash.

2. The computer-implemented method of claim 1 wherein the remote device is a remote mirroring device.

3. The computer-implemented method of claim 1 wherein the remote device is configured to maintain a single current copy of the data stored within the cache system.

4. The computer-implemented method of claim 1 wherein the remote device is a remote replication appliance.

5. The computer-implemented method of claim 1 wherein the at least one IO operation includes at least one write operation.

6. The computer-implemented method of claim 1 wherein the cache system is a write-back cache system.

7. A computer program product residing on a non-transitory computer readable medium having a plurality of instructions stored thereon which, when executed by a processor, cause the processor to perform operations comprising:
   providing an option to a user of a cache system to have a copy of at least one IO (input/output) operation directed toward the cache system redundantly provided to a remote device; and
   if the user selects to have the copy of at least one IO operation redundantly provided, automatically providing the copy of the at least one IO operation directed toward the cache system to the remote device to maintain a realtime backup copy and at least one historical copy of data from the cache system within the remote device; and
   if the user selects to restore an earlier version of the data included within the cache system, providing the earlier version of the data from the at least one historical copy;
   wherein the remote device functions as a replacement for the cache system during a server crash.

8. The computer program product of claim 7 wherein the remote device is a remote mirroring device.

9. The computer program product of claim 7 wherein the remote device is configured to maintain a single current copy of the data stored within the cache system.

10. The computer program product of claim 7 wherein the remote device is a remote replication appliance.

11. The computer program product of claim 7 wherein the at least one IO operation includes at least one write operation.

12. The computer program product of claim 7 wherein the cache system is a write-back cache system.

13. A computing system including at least one processor and at least one memory architecture coupled with the at least one processor, wherein the computing system is configured to perform operations comprising:

providing an option to a user of a cache system to have a copy of at least one IO (input/output) operation directed toward the cache system redundantly provided to a remote device; and if the user selects to have the copy of at least one IO operation redundantly provided, automatically providing the copy of the at least one IO operation directed toward the cache system to the remote device to maintain a realtime backup copy and at least one historical copy of data from the cache system within the remote device; and if the user selects to restore an earlier version of the data included within the cache system, providing the earlier version of the data from the at least one historical copy;

wherein the remote device functions as a replacement for the cache system during a server crash.

14. The computing system of claim 13 wherein the remote device is a remote mirroring device.

15. The computing system of claim 13 wherein the remote device is configured to maintain a single current copy of the data stored within the cache system.

16. The computing system of claim 13 wherein the remote device is a remote replication appliance.

17. The computing system of claim 13 wherein the at least one IO operation includes at least one write operation.

18. The computing system of claim 13 wherein the cache system is a write-back cache system.

\* \* \* \* \*